US009331312B2

(12) United States Patent
Yong et al.

(10) Patent No.: US 9,331,312 B2
(45) Date of Patent: May 3, 2016

(54) SECONDARY BATTERY

(75) Inventors: Jun-Sun Yong, Yongin-si (KR);
Chang-Seob Kim, Yongin-si (KR);
Sang-Jin Lee, Yongin-si (KR);
Sae-Weon Roh, Yongin-si (KR);
Sang-Jin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 320 days.

(21) Appl. No.: 13/475,838

(22) Filed: May 18, 2012

(65) Prior Publication Data

US 2013/0095364 A1     Apr. 18, 2013

Related U.S. Application Data

(60) Provisional application No. 61/546,416, filed on Oct. 12, 2011.

(51) Int. Cl.
| H01M 2/04 | (2006.01) |
| H01M 2/34 | (2006.01) |
| H01M 2/02 | (2006.01) |
| H01M 2/06 | (2006.01) |
| H01M 2/30 | (2006.01) |

(52) U.S. Cl.
CPC ........... *H01M 2/02* (2013.01); *H01M 2/04* (2013.01); *H01M 2/0404* (2013.01); *H01M 2/0473* (2013.01); *H01M 2/06* (2013.01); *H01M 2/30* (2013.01); *H01M 2/34* (2013.01)

(58) Field of Classification Search
None
See application file for complete search history.

(56) References Cited

U.S. PATENT DOCUMENTS

| 7,858,228 | B2 | 12/2010 | Yoon |
| 2004/0170887 | A1 | 9/2004 | Masumoto et al. |
| 2005/0266279 | A1* | 12/2005 | Kim .................. H01M 2/12 429/7 |
| 2009/0263711 | A1 | 10/2009 | Kim et al. |
| 2011/0064972 | A1 | 3/2011 | Park et al. |

FOREIGN PATENT DOCUMENTS

| CN | 1385908 A | 12/2002 |
| CN | 101752611 A | 6/2010 |
| EP | 2 144 312 A1 | 1/2013 |
| JP | 2002-343315 | * 11/2002 |
| JP | 2008-16190 | 1/2008 |
| JP | 2008-159395 | 7/2008 |
| KR | 2000-0014826 | 3/2000 |
| KR | 10-2004-0020946 | 3/2004 |
| KR | 10-2005-0110504 | 11/2005 |
| KR | 10-2006-0112743 | 11/2006 |

(Continued)

OTHER PUBLICATIONS

Machine translation of KR1020000014826, Mar. 2000.*
KIPO Notice of Allowance dated Dec. 26, 2013, for corresponding Korean Patent application 10-2012-0078508, (6 pages).

(Continued)

*Primary Examiner* — Jonathan Crepeau
(74) *Attorney, Agent, or Firm* — Lewis Roca Rothgerber Christie LLP

(57) ABSTRACT

A secondary battery including: an electrode assembly; a case containing the electrode assembly; a cap plate covering an opening of the case; a safety device on the cap plate and including a first lead; and an electrode terminal electrically connecting the electrode assembly and the first lead, the cap plate including a conductive member and an insulating portion, and the first lead is supported on the insulating portion, and the conductive member and the insulating portion being integrally formed.

18 Claims, 6 Drawing Sheets

(56) References Cited

FOREIGN PATENT DOCUMENTS

| KR | 10-2007-0013568 |   | 1/2007 |
|----|-----------------|---|--------|
| KR | 10-2007-0082943 |   | 8/2007 |
| KR | 10-2009-0056027 |   | 6/2009 |
| WO | WO 2009/069944  | * | 6/2009 |

OTHER PUBLICATIONS

EPO Search Report dated Dec. 17, 2013, for corresponding European Patent application 12177033.3, (5 pages).

English translation of Korean Office Action dated Jun. 28, 2013 in corresponding Korean application No. 10-2012-0078508 with Verification (6 pgs.).

SIPO Office action dated Aug. 22, 2014, with English translation, for corresponding Chinese Patent application 201210258733.6, (19 pages).

English machine translation of Chinese publication 1385908 dated Dec. 18, 2002, (26 pages).

SIPO Office action dated Apr. 7, 2015, with English translation, for corresponding Chinese Patent application 201210258733.6, (10 pages).

SIPO Office action dated Sep. 9, 2015, with English translation, corresponding to Chinese Patent application 201210285733.6, (28 pages).

EPO Office action dated Sep. 10, 2015, for corresponding European Patent application 12177033.3, (3 pages).

\* cited by examiner

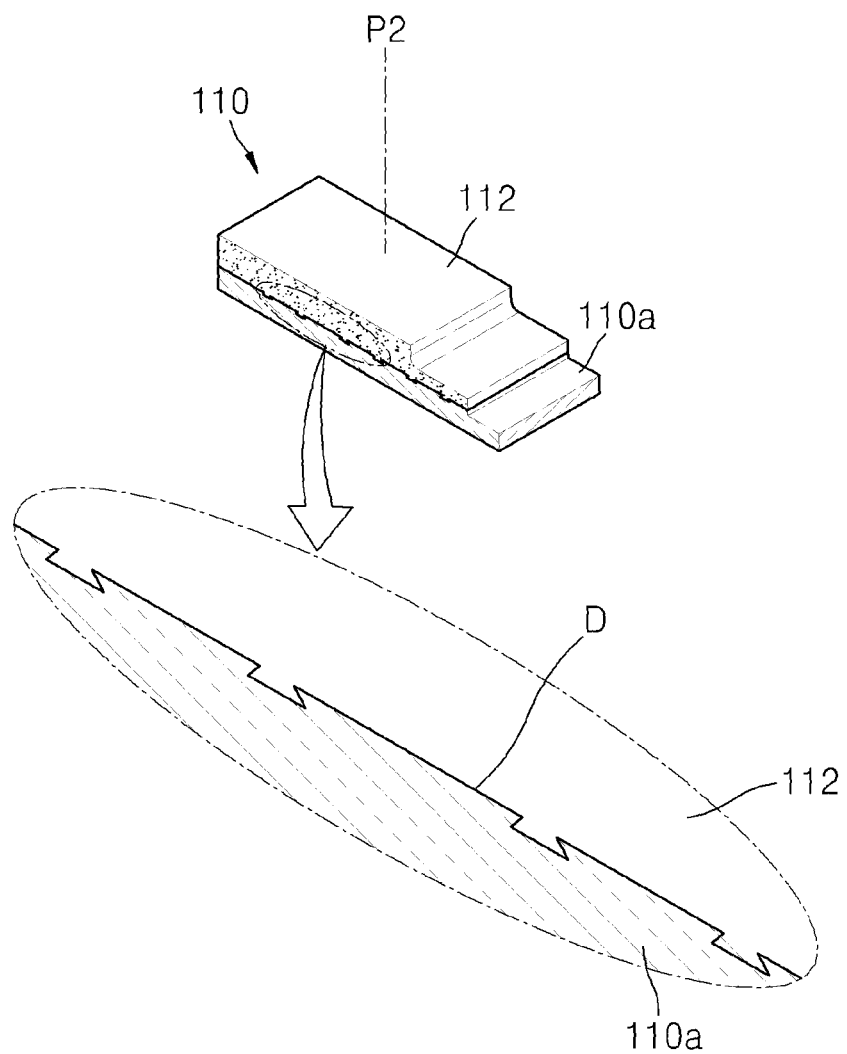

SECONDARY BATTERY

CROSS-REFERENCE TO RELATED APPLICATION

This application claims priority to and the benefit of U.S. Provisional Application No. 61/546,416, filed on Oct. 12, 2011 in the United States Patent and Trademark Office, the entire content of which is incorporated herein by reference.

BACKGROUND

1. Field

Aspects of embodiments of the present invention relate to a secondary battery.

2. Description of the Related Art

Technologies for mobile devices, such as mobile phones or notebook computers, have been constantly developed, and the production of such devices has continually increased. Thus, demand for secondary batteries as an energy source has increased significantly. For safety reasons, a secondary battery includes a safety device for performing a protection operation such as detecting a malfunction, such as overheating or a flow of excess current, or blocking a current flow.

SUMMARY

According to another aspect of embodiments of the present invention, a secondary battery can be assembled via a simple operation due to the use of a cap plate that is integrally formed with an insulating portion.

According to another aspect of embodiments of the present invention, a secondary battery can be made compact due to increased space efficiency for mounting parts.

According to one embodiment of the present invention, a secondary battery includes: an electrode assembly; a case containing the electrode assembly; a cap plate covering an opening of the case; a safety device on the cap plate and including a first lead; and an electrode terminal electrically connecting the electrode assembly and the first lead, the cap plate including a conductive member and an insulating portion, and the first lead is supported on the insulating portion, and the conductive member and the insulating portion being integrally formed.

The electrode terminal may extend through a through-hole of the first lead and a through-hole of the cap plate.

The electrode terminal may extend through the through-hole of the cap plate at a first position that is offset with respect to a central position of the cap plate.

The insulating portion and the electrode terminal may contact each other around a perimeter of the electrode terminal to seal the through-hole of the cap plate.

In one embodiment, the insulating portion extends through the through-hole of the cap plate and includes a first portion extending beyond the through-hole of the cap plate on a first side of the cap plate, and a second portion extending beyond the through-hole of the cap plate on a second side of the cap plate opposite the first side, the first and second portions being seamless with a portion of the insulating portion extending in the through-hole of the cap plate.

In one embodiment, the insulating portion extends between the first lead and the conductive member on a first side of the cap plate and extends between the electrode terminal and the conductive member on a second side of the cap plate opposite the first side.

The safety device may further include a body portion on the conductive member, the first lead extending from a side of the body portion; and a second lead extending from another side of the body portion. In one embodiment, the insulating portion is a first insulating portion, and the cap plate further includes a second insulating portion, and the second lead is supported on the second insulating portion. The conductive member and the first and second insulating portions may be integrally formed. The conductive member and the first and second insulating portions may be insert molded. The first and second insulating portions may be made of a same material.

The second lead may extend from the body portion to a central position of the cap plate, the body portion and the first lead being offset in a same direction from the central position.

In one embodiment, the safety device further includes a body portion, the first lead extending from a side of the body portion, and the secondary battery further includes a heat transmission member between and contacting the body portion and the conductive member. The heat transmission member may include an adhesive coupling the body portion to the conductive member. The heat transmission member may include silicone.

The conductive member and the insulating portion may conform to each other in a complementary uneven pattern. Interfacing surfaces of the conductive member and the insulating portion may include dovetail-shaped protrusions coupling the conductive member and the insulating portion to each other.

At least one of the conductive member or the insulating portion may have a dovetail-shaped groove, and the other of the conductive member or the insulating portion may have a complementary protrusion in the groove and coupling the other of the conductive member or the insulating portion to the at least one of the conductive member or the insulating portion.

The electrode terminal may include a first flange on the first lead, and a second flange coupled to an electrode tap of the electrode assembly. A width of the second flange is greater than a width of the first flange.

According to another embodiment of the present invention, a secondary battery includes: a cap plate that seals a case housing an electrode assembly and includes a conductive member and a first insulating portion which conform to each other in a complementary uneven pattern; a safety device including a first lead supported on the first insulating portion; and an electrode terminal that electrically connects the first lead to the electrode assembly.

The uneven pattern may be formed at an interface between the conductive member and the first insulating portion.

The uneven pattern may have a complementary dovetail shape to prevent or substantially prevent the conductive member and the first insulating portion from separating from each other.

The conductive member and the first insulating portion may each have protrusions having increasing widths in their protruding directions.

The cap plate may be an insert molded product in which the conductive member is integrated with the first insulating portion.

The electrode terminal may fix the first lead on the first insulating portion by passing through the first lead and the first insulating portion.

The first insulating portion may extend in a passing direction of the electrode terminal, and upper and lower ends of the electrode terminal arranged along the passing direction of the electrode terminal may extend in a surface direction of the cap plate.

The first insulating portion may be integrally formed as a unit.

An upper flange may be formed at an upper end of the electrode terminal which protrudes from the first insulating portion to fix the first lead by compression.

A lower flange may be formed at a lower end of the electrode terminal to form a surface contact with the electrode assembly.

An area of the lower flange may be wider than an area of the upper flange.

The electrode terminal may be formed at a position that is eccentric with respect to a central position of the cap plate.

The cap plate may further include a second insulating portion that supports a second lead of the safety device.

The second insulating portion may conform to the conductive member in a complementary uneven pattern.

The uneven pattern may have a complementary dovetail shape to prevent or substantially prevent the conductive member and the second insulating portion from separating from each other.

The conductive member and the second insulating portion may each have protrusions having increasing widths in their protruding directions.

The first insulating portion may be formed of a material that is used to form the second insulating portion.

The safety device may include a safety device body connected between the first and second leads, and the safety device body may be disposed on a portion of the conductive member between the first and second insulating portions.

According to an aspect of embodiments of the present invention, due to the use of a cap plate formed by integrating two materials having different electrical characteristics, an electrode terminal and a safety device may be supported while being insulated. Accordingly, a separate insulating element is not needed, and the entire assembly process of the secondary battery may be simplified.

According to another aspect of embodiments of the present invention, because the electrode terminal has different upper and lower flange areas, a terminal plate for securing a sufficient welding area between the electrode assembly and the electrode terminal is not needed.

According to another aspect of embodiments of the present invention, because the electrode terminal that has a portion protruding from an upper surface of the cap plate is eccentrically disposed with respect to a central position of the cap plate, a mounting space on the cap plate may be increased such that, for example, electrical parts may be compactly mounted on the cap plate.

BRIEF DESCRIPTION OF THE DRAWINGS

The accompanying drawings, together with the specification, illustrate some exemplary embodiments of the present invention, and, together with the description, serve to explain aspects and principles of the present invention.

FIGS. 6 and 7 are perspective cutaway views of first and second insulating portions, respectively, of the secondary battery of FIG. 1.

DETAILED DESCRIPTION

Some exemplary embodiments of the present invention are described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1:
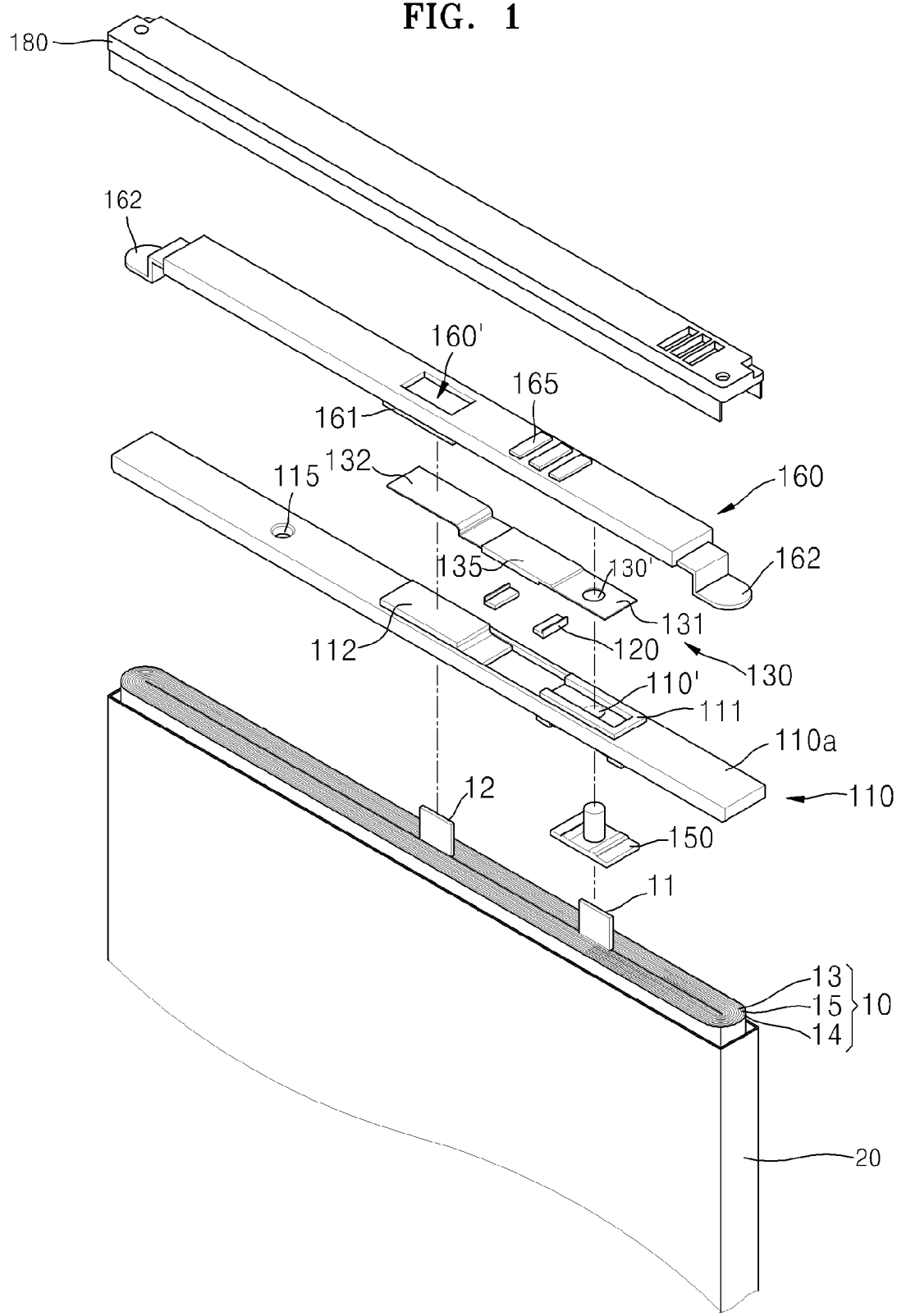
FIG. 1 is an exploded perspective view of a portion of a secondary battery according to an embodiment of the present invention.
Figure 2:
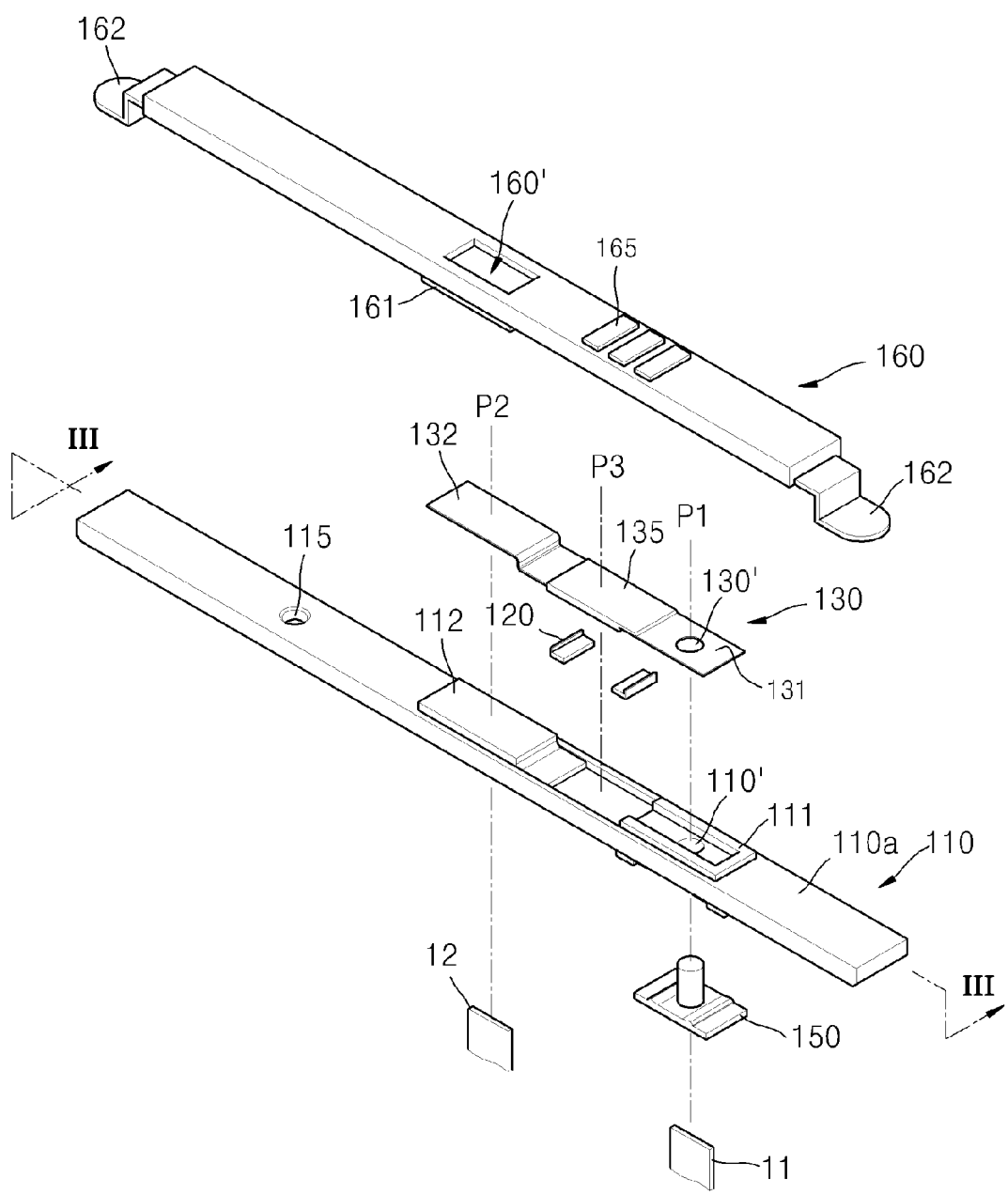
FIG. 2 is an enlarged exploded perspective view of a portion of the secondary battery of FIG. 1.

FIG. 1 is an exploded perspective view of a portion of a secondary battery according to an embodiment of the present invention. FIG. 2 is an enlarged exploded perspective view of a portion of the secondary battery of FIG. 1.

Referring to FIGS. 1 and 2, according to an embodiment of the present invention, a secondary battery includes a case 20 that houses an electrode assembly 10, a cap plate 110 that closes an open end of the case 20, and a safety device 130 that is mounted on the cap plate 110 and performs a safety operation in response to an abnormal operation, such as overheating or flow of excess current.

The electrode assembly 10 may be formed by interposing a separator 15 between a negative electrode plate 13 and a positive electrode plate 14 to separate the negative electrode plate 13 from the positive electrode plate 14, and then winding the negative electrode plate 13, the positive electrode plate 14, and the separator 15 in a jelly roll shape. Each of the negative electrode plate 13 and the positive electrode plate 14 includes an electrode active material. The negative electrode plate 13 and the positive electrode plate 14 may respectively include first and second electrode taps 11 and 12 that allow electrical charges formed due to a chemical reaction to flow out of the electrode assembly 10.

The electrode assembly 10 may be immersed in an electrolyte (not shown) inside the case 20. An opening of the case 20 may be sealed by the cap plate 110 after the electrode assembly 10 is placed therein. Contact portions of the cap plate 110 and the case 20 may be firmly coupled to each other, such as by welding (e.g., laser welding).

In one embodiment, the first electrode tap 11 of the electrode assembly 10 may contact an electrode terminal 150 that protrudes through the cap plate 110, and the second electrode tap 12 of the electrode assembly 10 may contact the cap plate 110. The electrode terminal 150 is coupled to the cap plate 110 while being insulated from the cap plate 110, and protrudes through the cap plate 110 to electrically connect the electrode assembly 10 to the safety device 130.

The safety device 130, in one embodiment, is disposed on the cap plate 110 and may regulate or block charge and discharge currents during malfunctioning, such as during occurrence of overheating or excess current. In one embodiment, the safety device 130 may have a positive temperature coefficient (PTC) and may include a fuse, a current block device, a bi-metal, or the like. The safety device 130, in one embodiment, may include a safety device body 135, and first and second leads 131 and 132 extending in opposite directions from the safety device body 135.

The cap plate 110, in one embodiment, may have a safety vent 115 of a rupturable type such that when an inner pressure of the case 20 exceeds a certain pressure (e.g., a set point), a gas discharge path is provided.

In one embodiment, a circuit portion 160 may be mounted on the cap plate 110. The circuit portion 160 may include an interconnection pattern (not shown) that enables electrical connection with an external device (not shown) and forms a charge and discharge current path. On a surface of the circuit portion 160, an outer connection terminal 165 for electrical connection with an external device may be formed, and first and second connection members 161 and 162 may be disposed on another surface. In one embodiment, for example, the first connection member 161 may contact the second lead 132 of the safety device 130, which is a negative electrode terminal. For example, in one embodiment, by using a welding electrode (not shown) protruding through an opening 160' of the circuit portion 160, the first connection member 161 may be coupled to the second lead 132 by welding. The second connection member 162, in one embodiment, may contact the cap plate 110 as a positive electrode terminal.

In one embodiment, the circuit portion 160 may function as a protection member for preventing or substantially preventing the occurrence of an overcharge, excess current, overdischarge, or the like, together with the safety device 130. In one embodiment, an upper cover 180 for housing the circuit portion 160 may be disposed on the cap plate 110.

Figure 3:
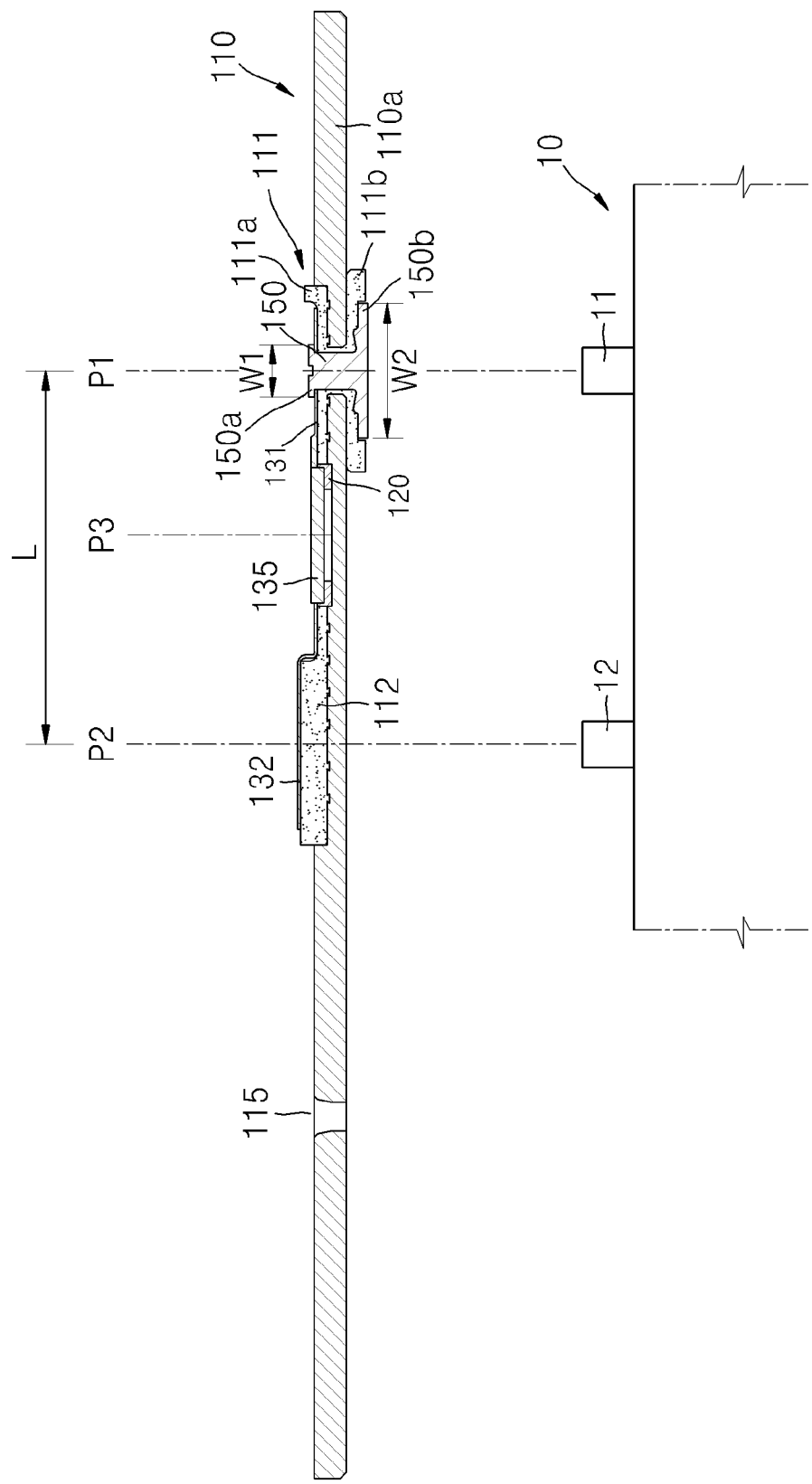
FIG. 3 is a cross-sectional view of the secondary battery of FIG. 1, taken along the line III-III of FIG. 2.
Figure 4:
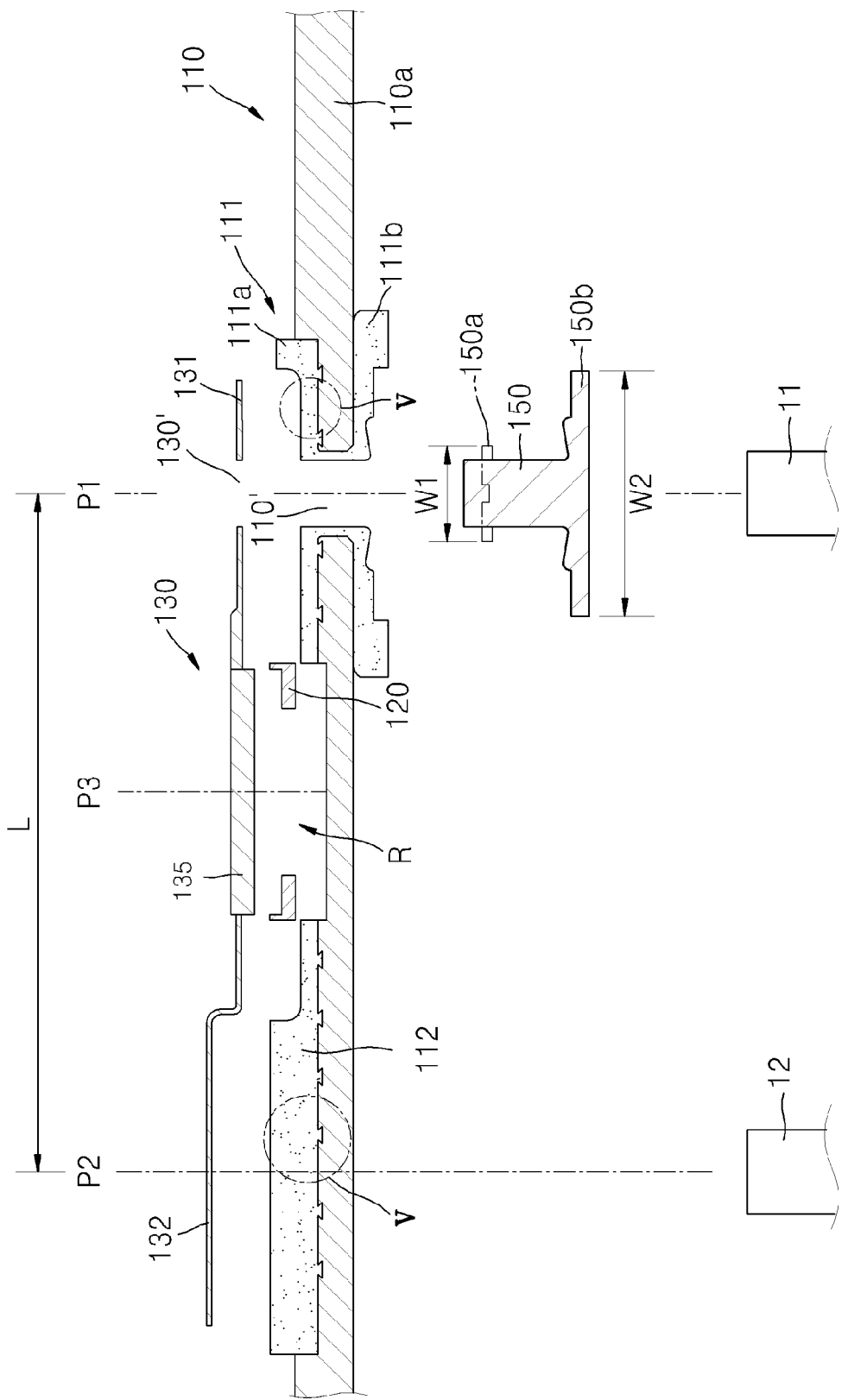
FIG. 4 is an enlarged exploded cross-sectional view of a portion of the secondary battery of FIG. 1.
Figure 5:
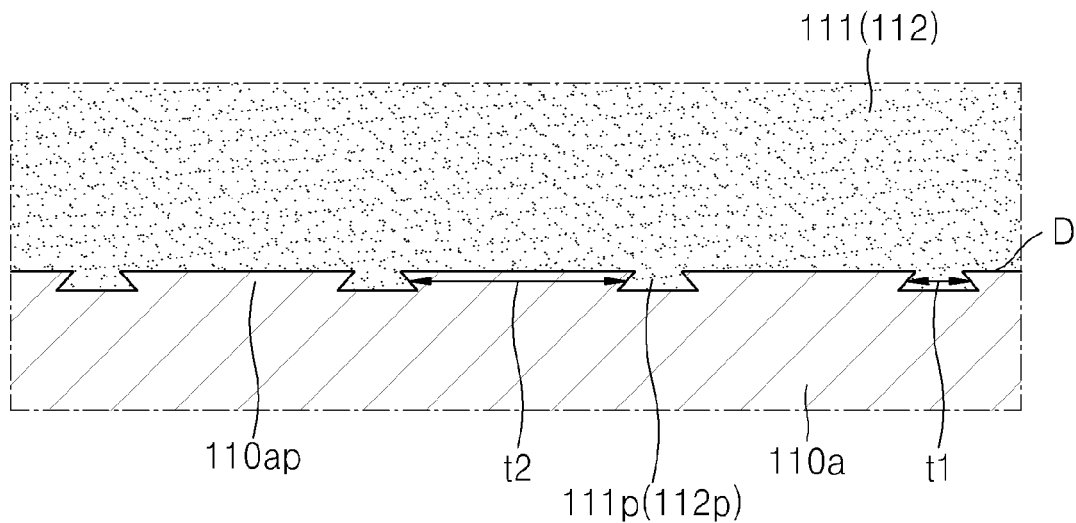
FIG. 5 is an enlarged cross-sectional view of a region V of FIG. 4.
Figure 6:
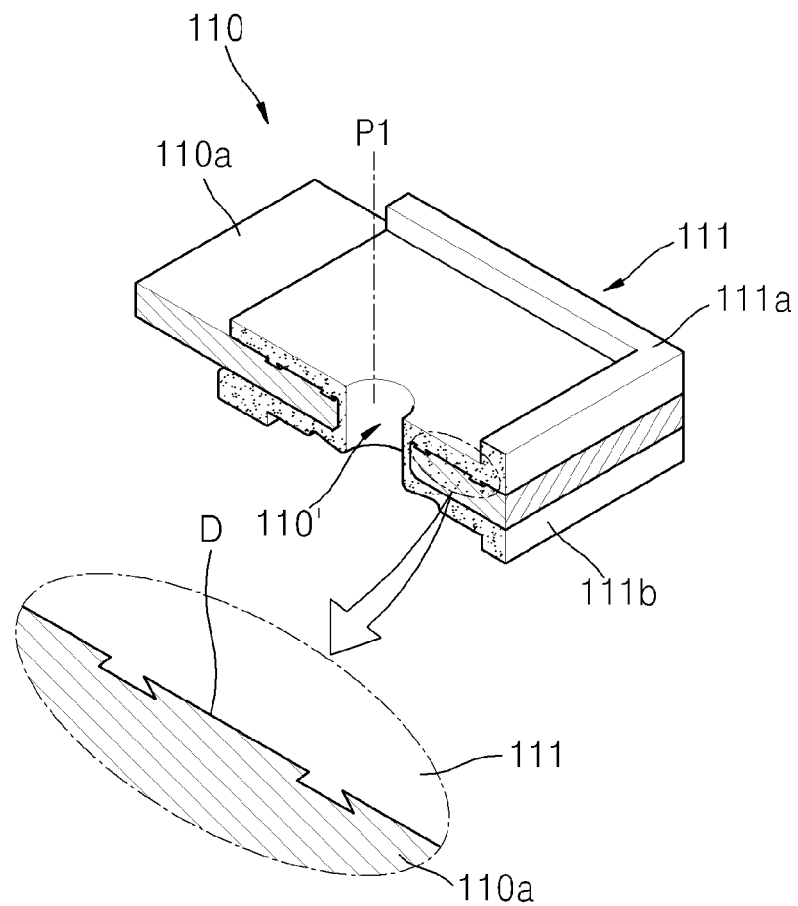

FIG. 3 is a cross-sectional view of the secondary battery of FIG. 1, taken along the line III-III of FIG. 2. FIG. 4 is an enlarged cross-sectional view of a portion of the secondary battery of FIG. 1. FIG. 5 is an enlarged cross-sectional view of a region V of FIG. 4. FIGS. 6 and 7 are perspective cutaway views of first and second insulating portions 111 and 112, respectively, of the secondary battery of FIG. 1.

Referring to FIG. 4, the cap plate 110, in one embodiment, is a plate formed by integrating two materials having different electrical characteristics. In one embodiment, the cap plate 110 includes a conductive member 110a that forms an overall skeleton of the cap plate 110, and the first and second insulating portions 111 and 112 that conform to the conductive member 110a.

Referring to FIGS. 4 and 5, in one embodiment, the first and second insulating portions 111 and 112 conform to the conductive member 110a in a complementary uneven pattern, and a dovetail-shaped uneven pattern D may be formed at an interface of the conductive member 110a and the first and second insulating portions 111 and 112 where the conductive member 110a is complementarily joined with the first and second insulating portions 111 and 112 to prevent or substantially prevent separation from each other. In one embodiment, the cap plate 110 may be formed as an insert molded product.

The conductive member 110a may be connected to the second electrode tap 12 of the electrode assembly 10 to form a positive electrode terminal. For example, the second electrode tap 12 of the electrode assembly 10 may be coupled to a lower surface of the conductive member 110a by welding, and an exposed portion of the conductive member 110a may function as a positive electrode terminal.

The first and second insulating portions 111 and 112 may respectively be formed at first and second positions P1 and P2 on the cap plate 110. The first and second insulating portions 111 and 112 may be formed on a surface of the conductive member 110a and/or may pass through the conductive member 110a.

In one embodiment, for example, the first insulating portion 111 may be formed through the conductive member 110a along a through-hole 110' of the cap plate 110. However, the present invention is not limited thereto. For example, in another embodiment, the first insulating portion 111 may be formed on the conductive member 110a, rather than through the conductive member 110a.

The first insulating portion 111, in one embodiment, supports the first lead 131 of the safety device 130 while insulating the first lead 131. The first insulating portion 111 electrically insulates the first lead 131 of the safety device 130 from the conductive member 110a and physically supports the first lead 131 of the safety device 130. The first insulating portion 111 prevents or substantially prevents a short circuit between a positive electrode and a negative electrode, that is, between the first lead 131 that is electrically connected to the first electrode tap 11 of the electrode assembly 10 and the conductive member 110a that is connected to the second electrode tap 12 of the electrode assembly 10.

The electrode terminal 150, in one embodiment, is inserted into the through-hole 110' of the first insulating portion 111. For example, the electrode terminal 150 may be inserted from a lower surface of the first insulating portion 111 and an upper portion of the electrode terminal 150 which protrudes from an upper surface of the first insulating portion 111 may be processed by caulking, spinning, or riveting to form an upper flange 150a that is widened toward a circumference of the electrode terminal 150. The upper flange 150a, in one embodiment, may fix the electrode terminal 150 on the cap plate 110 by compression.

The electrode terminal 150, in one embodiment, may be inserted into a through-hole 130' of the first lead 131 of the safety device 130 and the electrode terminal 150 may fix the first lead 131 by compression. The electrode terminal 150, in one embodiment, fixes the first lead 131 on the first insulating portion 111 by compression and forms an electrical connection with the safety device 130. For example, the electrode terminal 150 may be inserted into the through-hole 130' of the first lead 131 and the first lead 131 may be fixed on the first insulating portion 111 by the upper flange 150a of the electrode terminal 150. In this case, welding between the electrode terminal 150 and the safety device 130 may not be needed.

The first lead 131 of the safety device 130 may extend from the first position P1 where the first lead 131 is fixed on the first insulating portion 111 toward a third position P3 to be connected with the safety device body 135 disposed at the third position P3.

The first insulating portion 111, in one embodiment, supports the electrode terminal 150 and the first lead 131 of the safety device 130 while insulating the electrode terminal 150 and the first lead 131, thereby preventing or substantially preventing an electrical short circuit between the electrode terminal 150 and the first lead 131 and the conductive member 110a.

The first insulating portion 111 may extend through the through-hole 110' of the cap plate 110, and may extend toward a surrounding of the through-hole 110' and support the electrode terminal 150 and the first lead 131 while insulating the electrode terminal 150 and the first lead 131. The first insulating portion 111, in one embodiment, extends along the through-hole 110', and upper and lower ends 111a and 111b of the first insulating portion 111 may extend in a surface direction of the cap plate 110 and may be seamless with the portion of the first insulating portion 111 extending through the through-hole 110'.

The upper end 111a of first insulating portion 111 may insulate the first lead 131 and the lower end 111b may insulate a lower flange 150b of the electrode terminal 150. In one embodiment, a portion of the first insulating portion 111 disposed in the through-hole 110' may be integrated with (e.g., seamlessly integrated with) the upper and lower ends 111a and 111b.

Besides the insulating function of the first insulating portion 111 with respect to the electrode terminal 150, the first insulating portion 111, in one embodiment, has a gasket function for sealing the through-hole 110' of the cap plate 110. That is, the first insulating portion 111, in one embodiment, seals the surrounding of the through-hole 110' while surrounding the electrode terminal 150 to prevent or substantially prevent leakage of an electrolyte or permeation of external impurities through the through-hole 110'. In one embodiment, for example, the electrode terminal 150 may be forcedly inserted into the through-hole 110' of the first insulating portion 111, and, in one embodiment, the first insulating portion 111 is formed of a resin-based material and firmly contacts the circumference of the electrode terminal 150.

In one embodiment, the first insulating portion 111 conforms to and is integrated with the conductive member 110a, and at the interface of the first insulating portion 111 and the conductive member 110a, a dovetail-shaped uneven pattern D may form a coupling structure for preventing or substantially preventing separation of the first insulating portion 111 and the conductive member 110a, thereby allowing the first insulating portion 111 and the conductive member 110a to be firmly coupled to each other.

Referring to FIG. 5, the dovetail-shaped uneven pattern D may form a coupling structure for preventing or substantially preventing separation of the first insulating portion 111 and the conductive member 110a at the interface therebetween. In one embodiment, for example, protrusions 111p and 110ap of the first insulating portion 111 and the conductive member 110a have gradually increasing widths t1 and t2 along their protruding directions.

Referring to FIG. 3, because the electrode terminal 150 protrudes through the first insulating portion 111, the electrode terminal 150 may effectively fix the first lead 131 on the first insulating portion 111. In one embodiment, a position (e.g., the first position P1) of the electrode terminal 150 may be a position that is at an offset distance L eccentric with respect to a central portion (e.g., the second position P2) of the cap plate 110. Because the electrode terminal 150 is formed at the position (e.g., the first position P1) eccentric with respect to the central portion (e.g., the second position P2) of the cap plate 110, an installation space on the cap plate 110 may be effectively used such that, for example, electrical devices for controlling charge and discharge operations are compactly installable.

As described above, because the electrode terminal 150 is positioned at the offset first position P1 of the cap plate 110, a negative electrode terminal may be formable on the central portion (e.g., the second position P2) of the cap plate 110 by using the safety device 130 that extends from the first position P1 to the central portion (e.g., the second position P2) of the cap plate 110. That is, the safety device 130 may extend from the first position P1 to the central portion (e.g., the second position P2) of the cap plate 110 such that the second lead 132 may form a negative electrode terminal on the central portion (e.g., the second position P2) of the cap plate 110.

The electrode terminal 150, in one embodiment, electrically connects the electrode assembly 10 and the safety device 130 that are disposed on opposite sides of the cap plate 110 to each other. In one embodiment, for example, the electrode terminal 150 may be electrically connected to the first lead 131 of the safety device 130 through the upper flange 150a and may be electrically connected to the electrode assembly 10 through the lower flange 150b.

In one embodiment, the lower flange 150b of the electrode terminal 150 may have a wider area than the upper flange 150a and may provide a wide area for welding with the electrode assembly 10. That is, a width or radius W2 of the lower flange 150b may be wider than a width or radius W1 of the upper flange 150a. Due to the area of the lower flange 150b being wider than that of the upper flange 150a, a terminal plate may not be needed for increasing a welding area between the electrode terminal 150 and the electrode assembly 10.

The second insulating portion 112, in one embodiment, supports the second lead 132 of the safety device 130 while insulating the second lead 132. The second insulating portion 112, in one embodiment, may be formed at the central portion (e.g., the second position P2) on the cap plate 110. The second insulating portion 112 may be formed on the surface of the conductive member 110a that forms a skeleton of the cap plate 110.

The second insulating portion 112 may conform to and may be integrated with the conductive member 110a, and at an interface between the second insulating portion 112 and the conductive member 110a, the dovetail-shaped uneven pattern D may form a coupling structure for preventing or substantially preventing separation of the second insulating portion 112 and the conductive member 110a.

Referring to FIG. 5, the dovetail-shaped uneven pattern D may form a coupling structure for preventing or substantially preventing separation of the second insulating portion 112 and the conductive member 110a at the interface therebetween. In one embodiment, for example, protrusions 112p and 110ap of the second insulating portion 112 and the conductive member 110a may have gradually increasing widths t1 and t2 along their protruding directions.

Referring to FIG. 4, the second lead 132 of the safety device 130 may be electrically connected to the first electrode tap 11 of the electrode assembly 10 through the electrode terminal 150 and may form a negative electrode terminal. In one embodiment, the second lead 132 of the safety device 130 may be exposed and supported on the second insulating portion 112 to form a negative electrode terminal.

The cap plate 110, in one embodiment, may be formed as an insert molded product that is formed by integrating the conductive member 110a forming a skeleton of the cap plate 110 with the first and second insulating portions 111 and 112 conforming to the conductive member 110a. In one embodiment, for example, during insert molding, the conductive member 110a may be temporally fixed at a position (e.g., a predetermined position) inside a mold frame (not shown) and, then, a molten molding resin may be loaded into the mold frame to form the cap plate 110 that includes the conductive member 110a and the first and second insulating portions 111 and 112 which are all integrated as one body. Through the insert molding, the first and second insulating portions 111 and 112 may be concurrently or simultaneously formed of the same material. In one embodiment, for example, the first and second insulating portions 111 and 112 may be formed of a resin-based material.

The conductive member 110a, in one embodiment, functions as a positive electrode terminal. Due to the integration of the conductive member 110a with the first and second insulating portions 111 and 112 that support the electrode terminal 150 and the safety device 130 which have polarities opposite to that of the conductive member 110a while insulating the electrode terminal 150 and the safety device 130, a conventional process for disposing a separate insulating material on the cap plate 110 is not required. Also, due to the formation of a unit module in which the conductive member 110a is integrated with the first and second insulating portions 111 and 112, the overall assembly process for a secondary battery may be simplified.

The safety device 130, in one embodiment, includes the first and second leads 131 and 132 supported by the first and second insulating portions 111 and 112, and the safety device body 135 interposed between the first and second leads 131 and 132. The safety device body 135 may be disposed in a recess R between the first and second insulating portions 111 and 112. In one embodiment, the safety device body 135 is disposed on a portion of the conductive member 110a on which the first and second insulating portions 111 and 112 are not formed, and the safety device body 135 may precisely sense an inner temperature of the secondary battery.

In one embodiment, a heat transmission member 120 may be interposed between the safety device body 135 and the cap plate 110, and, particularly, between the safety device body 135 and the conductive member 110a. The heat transmission member 120 may be interposed between the safety device body 135 and the cap plate 110 to allow the safety device body 135 and the cap plate 110 to thermally contact each other.

The heat transmission member 120 may be formed of a flexible and thermally conductive material such that the heat transmission member 120 may be smoothly deformed between the safety device body 135 and the cap plate 110 and may firmly contact the safety device body 135 and the cap plate 110. In one embodiment, the heat transmission member 120 may include an adhesive material for firmly contacting the safety device body 135 and the cap plate 110. For example, the heat transmission member 120 may be formed of a composite material, such as a mix sheet containing thermally conductive particles.

In another embodiment, the heat transmission member 120 may be formed by application of thermally conductive silicone. For example, thermally conductive silicone may be applied at a position on which the safety device body 135 is to be mounted, and then, another heat transmission member having a sheet shape may be deposited thereon.

In one embodiment, an insulating coating or an insulating film (not shown) may be formed on a surface of the safety device body 135, and these insulating materials may be integrated as an outer material with the safety device body 135.

While the present invention has been particularly shown and described with reference to some exemplary embodiments thereof, it will be understood by those of ordinary skill in the art that various changes in form and details may be made therein without departing from the spirit and scope of the present invention as defined by the following claims. Descriptions of features or aspects within each embodiment should typically be considered as available for other similar features or aspects in other embodiments.

What is claimed is:

1. A secondary battery comprising:
an electrode assembly;
a case containing the electrode assembly;
a cap plate covering an opening of the case;
a safety device on the cap plate and comprising a body portion and a first lead extending from a side of the body portion; and
an electrode terminal electrically connecting the electrode assembly and the first lead,
wherein the cap plate comprises a conductive member and an insulating portion, and the first lead is supported on the insulating, portion,
wherein the conductive member and the insulating portion are integrally formed,
wherein the electrode terminal extends through a through-hole of the cap plate in a first direction,
wherein each of the body portion and the first lead are spaced apart from a central axis at a same side of the central axis, the central axis extending through the cap plate in the first direction,
wherein the insulating portion is seamless and extends through the through-hole of the cap plate, the seamless insulating portion further extending outside the through-hole of the cap plate and along a first lateral surface of the cap plate on a first side of the cap plate and through Which the through-hole passes, the seamless insulating portion further extending outside the through-hole of the cap plate and along a second lateral surface of the cap plate opposite the first lateral surface on a second side of the cap plate and through which the through-hole passes, the seamless insulating portion surrounding a perimeter of the eletrode terminal within the through-hole cap plate,
wherein the electrode terminal comprises a first flange on the second side of the cap plate and coupled to an electrode tap of the electrode assembly, the insulating portion insulating and surrounding a pair of opposing sides of the first flange, and
wherein the electrode terminal extends through a through-hole of the first lead.

2. The secondary battery of claim 1, wherein the electrode terminal extends through the through-hole of the cap plate at a first position that is offset with respect to a central position of the cap plate.

3. The secondary battery of claim 1, wherein the insulating portion and the electrode terminal contact each other around the perimeter of the electrode terminal to seal the through-hole of the cap plate.

4. The secondary battery of claim 1, wherein the insulating portion extends between the first lead and the conductive member on the first side of the cap plate and extends between the first flange of the electrode terminal and the conductive member on the second side of the cap plate opposite the first side.

5. The secondary battery of claim 1, wherein:
the body portion is on the conductive member; and
the safety device farther comprises a second lead extending from another side of the body portion.

6. A secondary battery comprising:
an electrode assembly;
a case containing the electrode assembly;
a cap plate covering an opening of the case;
a safety device on the cap plate and comprising a body portion and first lead extending from a side of the body portion; and
an electrode terminal electrically connecting the electrode assembly and the first lead,
wherein the cap plate comprises a conductive member and an insulating portion, and the first lead is supported on the insulating portion,
wherein the conductive member and the insulating portion are integrally formed,
wherein the electrode terminal extends through a through-hole of the cap plate in a first direction,
wherein each of the of the body portion and the first lead are spaced apart from a central axis at a same side of the central axis, the center axis extending through the cap plate in the first direction,
wherein the insulating portion is seamless and extends through the through-hole of the cap plate, the seamless insulating portion further extending outside the through-hole of the cap plate and along a first lateral surface of the cap plate on a first side of the cap plate and through which the through-hole passes the seamless insulating portion further extending outside the through-hole of the cap plate and along a second lateral surface of the cap plate opposite the first lateral surface on a second side of the cap plate and through which the through-hole passes, the seamless insulating portion surrounding a perimeter of the electrode terminal within the through-hole of the cap the plate, wherein the electrode terminal comprises a first flange on the second side of the cap plate and coupled to an electrode tap of the electrode assembly, the insulating portion insulating and surrounding a pair of opposing sides of the first flange, wherein:
the body portion is on the conductive member; and
the safety device further comprises a second lead extending from another side of the body portion, wherein the insulating portion is a first insulating portion, and the cap plate further comprises a second insulating portion, and wherein the second lead is supported on the second insulating portion.

7. The secondary battery of claim 6, wherein the conductive member and the first and second insulating portions are integrally formed.

8. The secondary battery of claim 7, wherein the conductive member and the first and second insulating portions are insert molded.

9. The secondary battery of claim 6, wherein the first and second insulating portions are made of a same material.

10. The secondary battery of claim 5, the second lead extends from the body portion to a central position of the cap plate, the body portion and the first lead being offset in a same direction from the central position.

11. A secondary battery comprising:
an electrode assembly;
a case containing the elecode assembly;
a cap plate covering an opening the case;
a safety device on the cap plate and comprising a body poetion and a first lead extending from a side of the body portion; and
an electrode terminal electrically connecting the electrode assembly and the first lead,
wherein the cap plate comprises a conductive member and insulating portion, and the first lead is supported on the insulating portion,
wherein the conductive member and the insulating portion are integrally formed,
wherein the electrode terminal extends through a through-hole of the cap plate in a first direction,
wherein each of the body portion and the first lead are spaced apart from a central axis at a same side of the central axis, the central axis extending through the cap plate in the first direction,
wherein the insulating portion is seamless and extends through the through-hole of the cap plate, the seamless insulating portion further extending outside the through-hole of the cap plate and along a first lateral surface of the cap plate on a first side of the cap plate and through which the through-hole passes, the seamless insulating portion further extending outside the though-hole of the cap plate and along a second lateral surface of the cap plate opposite the first lateral surface on a second side of the cap plate and through which the through-hole passes, the seamless insulating portion surrounding a perimeter of the electrode terminal within the through-hole of the cap plate,
wherein the electrode terminal comprises a first flange on the second side of the cap plate and coupled to an electrode tap of the electrode assembly, the insulating portion insulating and surrounding a pair of opposing sides of the first flange, and
wherein the secondary battery further comprises a heat transmission member between and contacting the body portion and the conductive member.

12. The secondary battery of claim 11, wherein the heat transmission member comprises an adhesive coupling the body portion to the conductive member.

13. The secondary battery of claim 11, wherein the heat transmission member comprises silicone.

14. The secondary battery of claim 1, wherein the conductive member and the insulating portion conform to each other in a complementary uneven pattern.

15. The secondary battery of claim 14, wherein interfacing surfaces of the conductive member and the insulating portion comprise dovetail-shaped protrusions coupling the conductive member and the insulating portion to each other.

16. The secondary battery of claim 1, wherein at least one of the conductive member or the insulating portion has a dovetail-shaped groove, and the other of the conductive member or the insulating portion has a complementary protrusion in the groove and coupling the other of the conductive member or the insulating portion to the at least one of the conductive member or the insulating portion.

17. The secondary battery of claim 1, wherein the electrode terminal further comprises a second flange on the first lead.

18. The secondary battery of claim 17, wherein a width of the first flange is greater than a width of the second flange.

* * * * *